United States Patent [19]

Slegt

[11] Patent Number: 6,046,438
[45] Date of Patent: Apr. 4, 2000

[54] THICK FILM HEATING ELEMENT WITH THERMAL SENSOR DISPOSED IN THINNER PART OF SUBSTRATE

[75] Inventor: Sander Slegt, Leeu, Netherlands

[73] Assignee: U.S. Philips Corporation, New York, N.Y.

[21] Appl. No.: 09/086,271

[22] Filed: May 29, 1998

[30] Foreign Application Priority Data

May 29, 1997 [EP] European Pat. Off. .............. 97303631

[51] Int. Cl.[7] .................................................. H05B 3/00
[52] U.S. Cl. ................ 219/441; 219/448.11; 219/466.1; 219/543; 338/307
[58] Field of Search ................................... 219/441, 442, 219/448.11–448.19, 466.1, 543, 494, 251, 254, 255, 449, 450, 464, 466, 468; 392/444; 338/306–309

[56] References Cited

U.S. PATENT DOCUMENTS

| 1,615,464 | 1/1927 | Marsden | 219/254 |
| 2,296,591 | 9/1942 | Barnes | 219/254 |
| 2,337,836 | 12/1943 | Price | 219/254 |
| 3,505,498 | 4/1970 | Shevlin | 219/543 |
| 3,710,076 | 1/1973 | Frazier | 219/449 |
| 4,851,645 | 7/1989 | Wolf et al. | 219/464 |
| 4,852,471 | 8/1989 | Lansing | 219/441 |

FOREIGN PATENT DOCUMENTS

| 238331 | 2/1964 | Austria | 219/441 |
| 0585015A1 | 3/1994 | European Pat. Off. . | |
| 2283618 | 3/1976 | France | 392/444 |
| 396245 | 1/1966 | Switzerland | 219/251 |

*Primary Examiner*—John A. Jeffrey
*Attorney, Agent, or Firm*—Ernestine C. Bartlett

[57] ABSTRACT

A heating element 2 comprises a substantially planar substrate 4 having a heating track or tracks 8 and a thermal sensor 10, in the form of a track or discrete component, disposed on one side of the substrate 4. The thermal sensor 10 is separated from the heating track 8 by a locally thinner portion 12 of the substrate 4. The sensor 10 may be located in, or surrounded by, the thinner portion 12.

12 Claims, 3 Drawing Sheets

THICK FILM HEATING ELEMENT WITH THERMAL SENSOR DISPOSED IN THINNER PART OF SUBSTRATE

BACKGROUND OF THE INVENTION

This invention relates to electric heating elements, for example for use in liquid heating vessels such as kettles, rice cookers, coffee makers, etc.

Various types of heating elements are known for the above applications. Until now, the most common form of heating element is the immersion element which basically comprises a metal coil which heats up when a current is passed through it.

Recently, there has been a shift to flat heating elements. In the case of electric kettles, for example, these provide the advantage that cleaning the inside of the kettle is easier, and it may be possible to boil a small quantity of water, since a smaller quantity is required to cover the heating element. One way to produce flat heating elements is simply to bond a conventional coil to the underside of a flat metal substrate. However, the use of thick film heating elements is now being explored for liquid heating applications. The invention concerns these thick film heating elements.

It is known to provide thermal sensors on this type of heating element adjacent to the thick film heating tracks. It is also possible to form the heating tracks and the thermal sensors using a single manufacturing process, when thick film thermal sensors are employed. EP-0 585 015 discloses a thick film heating element having at least one temperature sensor formed as an electrically resistive track. The temperature sensor sends signals representing overheating of the heating element, which enables the power to the element to be switched off.

A problem with temperature sensors formed adjacent the heating element tracks is that the temperature sensors do not closely follow the temperature of the material to be heated (on the opposite side of the heating element substrate), but instead are influenced by the heat produced in the heating tracks. The response of the temperature sensor to thermal changes in the material to be heated is therefore limited.

SUMMARY OF THE INVENTION

According to the invention there is provided a heating element comprising a substantially planar substrate having a heating track and a temperature responsive sensor each disposed on one side of the substrate, wherein the temperature responsive sensor is separated from the heating track by a locally thinner portion of the substrate.

The locally thinner portion of the substrate increases the thermal resistance between the sensor and the heating track. Consequently, the temperature sensor responds more accurately to the temperature of the material to be heated. Preferably, the locally thinner portion is defined by a recess in the side of the substrate having the heating track and temperature sensor. The temperature sensor may be disposed on the locally thinner portion of the substrate, or may be surrounded or partially surrounded by it. The temperature responsive sensor track may comprise an electrically resistive track having a predetermined temperature coefficient of resistance, or may comprise a discrete sensor. The invention also provides an electric kettle having a heating element of the invention.

The invention will now be described by way of example, with reference to and as shown in the accompanying drawings, in which:

BRIEF DESCRIPTION OF THE PREFERRED EMBODIMENTS

Figure 1:
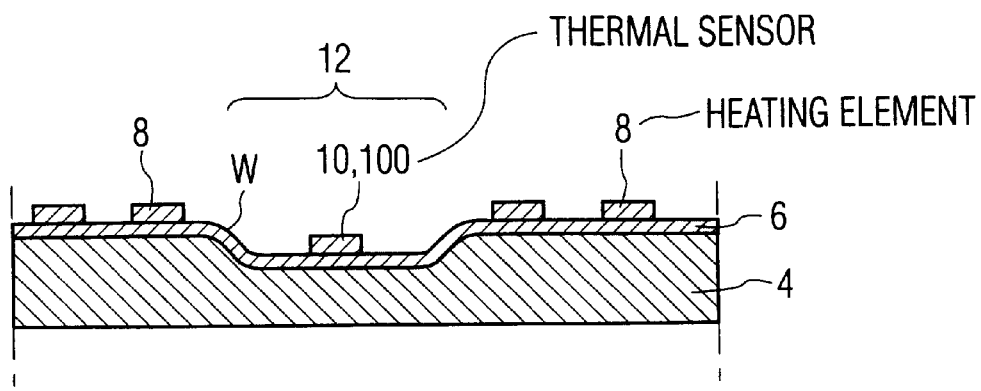
FIG. 1 shows, in cross section, a first heating element in accordance with the invention.

FIG. 1 shows a first heating element according to the invention. The heating element 2 comprises a substrate 4 over which there is provided an insulating dielectric layer 6 and electrically resistive heating tracks 8 on the insulating layer 6. A thermal sensor also in the form of a resistive track 10 is provided over the dielectric layer 6. As shown in FIG. 1, the track 10 which defines the thermal sensor is provided over a locally thinner portion 12 of the substrate 4.

Figure 2:
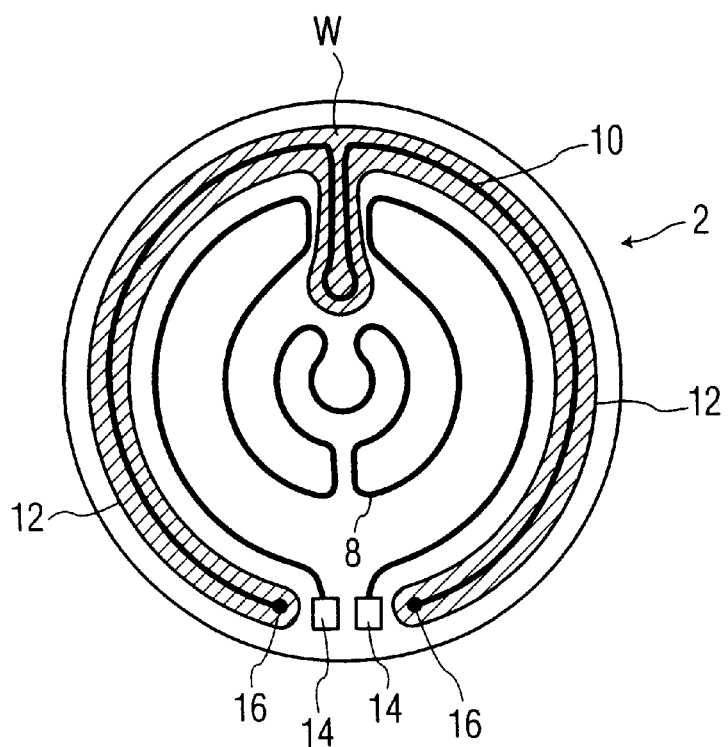
FIG. 2 shows one arrangement of heating track and a thermal sensor in the form of resistive track.

The substrate 4 comprises a plate of heat conductive material, such as steel or stainless steel. Stainless steel is preferred because the anti-corrosion benefits are useful for water heating applications. The substrate 4 is generally formed as a planar sheet of metal and may have any suitable shape. A circular element (particularly suitable for a kettle base) is shown in FIG. 2. The thickness of the substrate will depend upon the application for the heating element, but typically a substrate thickness of approximately 1 to 3 mm gives the heating element sufficient rigidity, while still allowing sufficient transfer of heat through the element (the material to be heated contacting the side of the substrate 4 opposite the heating tracks 8).

Regions are provided in the substrate 4 which have a reduced thickness, so as to define locally thinner portions 12 of the substrate 4. In the embodiment shown in FIG. 1, the locally thinner portions 12 are defined by an indentation or indentations in the surface of the substrate 4 on which the heating tracks 8 and temperature sensor track 10 are provided. This indentation may be provided by any suitable technique, either before, during or after shaping of the substrate. For example, the indentation may be formed by stamping, milling, turning, deep-drawing or embossing techniques, or any other suitable technique for shaping sheet metal. Alternatively, the substrate may be cast in its final shape, instead of being cut from sheet metal.

The insulating layer 6, which is formed over the contoured side of the substrate 4, may, for example, comprise a glass ceramic or a porcelain enamel material. According to the coating selected, application may be by printing, spraying or dipping. The skilled addressee will appreciate that various ceramic and enamel compositions may be selected, and that various appropriate techniques are available for forming the insulating layer 6.

The heating track 8 and the thermal sensor track 10 are preferably formed simultaneously on the insulating layer 6 using a thick film technique. The heating track 8 comprises a resistive path connected between two terminals 14 and may be in any suitable shape. Shown in FIG. 2 is a serpentine track which increases the length of the track. The heating track may be comprised of a number of parallel branches. The thermal sensor track 10 also comprises a resistance path connected between two terminals 16. The thermal sensor is formed from a material having a known (positive or negative) temperature coefficient of resistance. Appropriate control circuitry then monitors the resistance of the sensor track in order to determine the temperature of the track.

The heating track 8 and the thermal sensor track 10 may be formed from the same material, if a suitable material can provide the power requirements of the heating track as well as the temperature responsive characteristics required for the sensor track. Of course, these tracks may be formed from different materials. The tracks may, for example, comprise a screen-printed paste which is fired to bond the tracks to the insulating layer 6. Silver palladium or nickel-based heating tracks are conventional in the art.

The use of a thermal sensor in the form of a resistance path is known. However, in previous thick film heating elements having thick film thermal sensors, the problem arises that temperature of the thermal sensor does not accurately follow the temperature of the material to be heated, which is on the opposite side of the substrate 4.

It has been found that the most important factor which causes this error in the temperature measured by the sensor 10 is the lateral heat conduction between the tracks 8 and the sensor 10.

In the heating element of FIG. 1, the sensor track is separated from the heater track by a locally thinner portion of the substrate, so that the thermal resistance between the sensor and the heating track is increased. In this way, the temperature of the sensor follows more accurately that of the material being heated. The effect of the locally thinner portion of the substrate is effectively to increase the distance between the sensor track 10 and heating track 8. It may, of course, be possible to increase the physical separation between the heating track and the sensor track, but in applications requiring a small heating element or requiring a densely distributed heating track path, it is not possible to provide a large separation area adjacent the sensor.

The provision of the sensor track 10 on the locally thinner portion 12 of the substrate also results in a reduced distance between the sensor 10 and the material to be heated, so that the thermal resistance is reduced. This further improves the response of the sensor to the temperature of the material being heated.

In the example shown in FIG. 2, a portion of the sensor track 10 extends around the periphery of the heating element 2 in a well W which defines the thinner portion 12 of the substrate 4. When the sensor track 10 extends around the periphery of the heating element 2, local hot spots can be detected, which may arise when the heating apparatus reaches an overheat condition and is placed on a slope. Of course, many other configurations for the heater track 8 and for the sensor track 10 may be contemplated.

Figure 3:
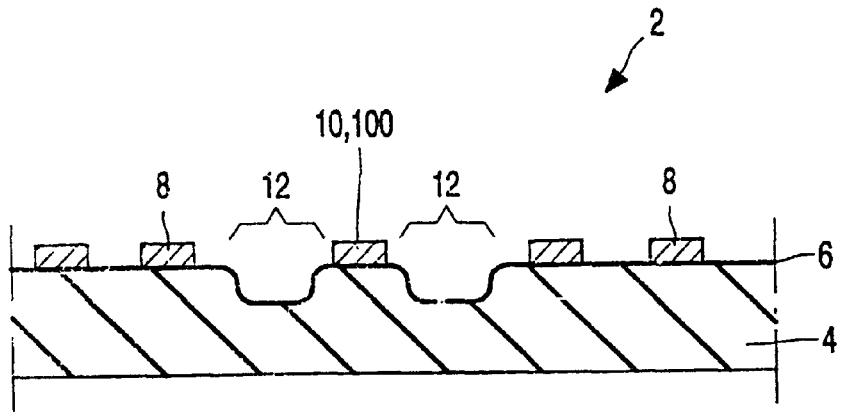
FIG. 3 shows, in cross section, a second heating element in accordance with the invention.

In the example of FIGS. 1 and 2, the sensor track 10 is disposed on the locally thinner portion of the substrate. It is also possible to provide the locally thinner portion 12 of the substrate on either side of the sensor track 10, which may be provided on a region of the substrate 4 having full thickness. This has the advantage that printing of the sensor track 10 is made easier. This possibility is shown in FIG. 3. This may also have the advantage of increasing further the thermal resistance between the sensor track 10 and the heating track 8.

Figure 4:
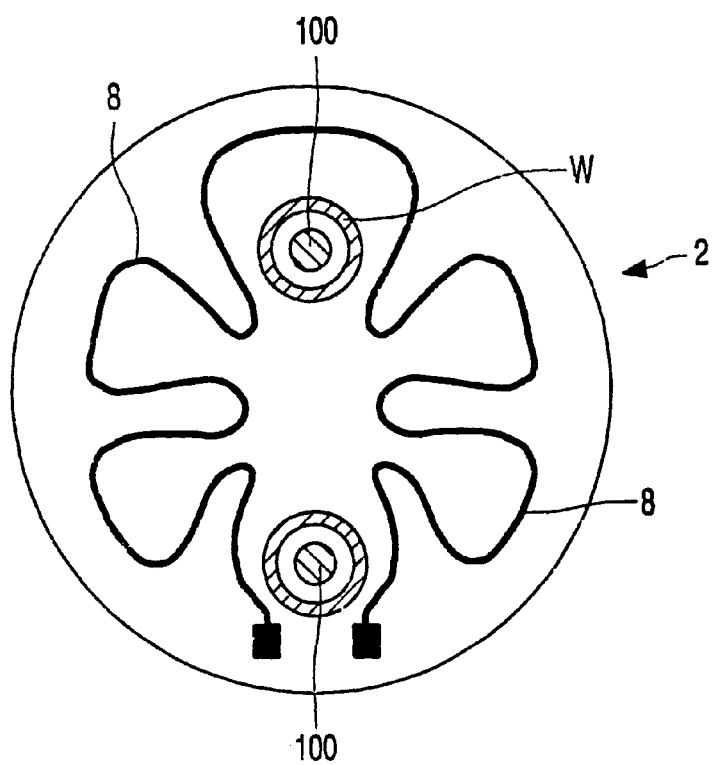
FIG. 4 shows one arrangement of heating track and thermal sensors in the form of discrete sensors.

Although the temperature sensor has so far been described as a sensor track 10, it is equally possible to provide discrete thermal sensors 100 on the substrate. These thermal sensors 100 may be provided on the locally thinner portion of the substrate in the manner shown in FIG. 1, or may be surrounded or partially surrounded by the locally thinner portion in the manner shown in FIG. 3. For example, FIG. 4 shows a substrate having two thermal sensors 100 each surrounded by a well W defined by the locally thinner portion 12 of the substrate. The thermal sensors 100 may comprise elements of predetermined temperature coefficient of resistance, for example elements having a negative temperature coefficient of resistance.

Although the substrate 4 is shown as planar in the Figures it may be desirable for the substrate 4 to have a slightly domed shape, with the insulating layer 6 and resistance tracks 8, 10 provided on a concave face of the substrate 4.

Figure 5:
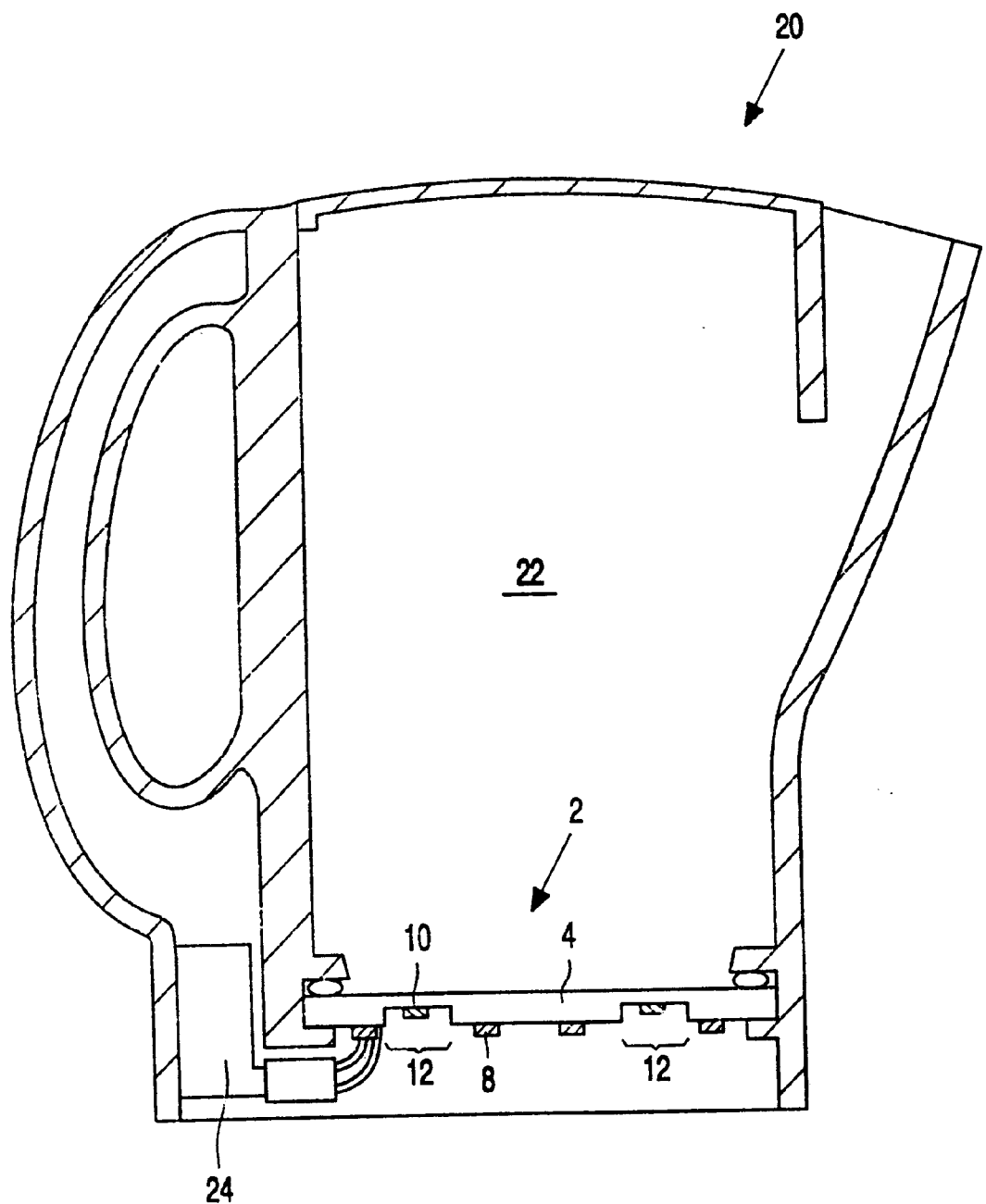
FIG. 5 shows an electric kettle incorporating the heating element of the invention.

FIG. 5 shows, in simplified form, a kettle employing a heating element of the invention. As is conventional, the heating element 2 is suspended in the base of the kettle 20 with the heating track 8 and sensor 10 facing downwardly. During operation of the kettle, heat is transferred from the heating track 8 through the insulating layer 6 and the substrate 4 into the body 22 of the kettle 20. The kettle 20 includes a control unit 24 which may include a cordless or conventional connector, and which is coupled to the terminals 14 of the heating track 8, and the terminals of the sensor 10.

The types of thermal control which may be used in the kettle 20 do not affect the present invention and will not be described. There are, of course, numerous heating applications to which the heating elements 2 of the invention may be applied. Indeed, the invention may be applied to any known applications of thick film heating elements where temperature sensing is desired.

What is claimed is:

1. A relatively flat thick film heating element comprising a substantially planar electrically insulated surface of a substrate and having an electrically resistive heating track and a temperature-responsive sensor each disposed on the electrically insulated surface of said substrate, wherein the temperature-responsive sensor is separated from the heating track by a locally thinner portion of the electrically insulated surface of the substrate.

2. A heating element as claimed in claim 1, wherein the locally thinner portion is defined by at least one recess in the electrically insulated surface of the substrate.

3. An electric kettle including a heating element as claimed in claim 2.

4. A heating element as claimed in claim 1, wherein the temperature-responsive sensor comprises an electrically resistive track with a predetermined temperature coefficient of resistance.

5. An electric kettle including a heating element as claimed in claim 4.

6. A heating element as claimed in claim 1, wherein the temperature-responsive sensor comprises a discrete temperature sensor.

7. An electric kettle including a heating element as claimed in claim 6.

8. A heating element as claimed in claim 1, wherein the temperature-responsive sensor is provided on the locally thinner portion of the electrically insulated surface of substrate.

9. An electric kettle including a heating element as claimed in claim 8.

10. A heating element as claimed in claim 1, wherein the temperature-responsive sensor is at least partially surrounded by the locally thinner portion of the electrically insulated surface of the substrate.

11. An electric kettle including a heating element as claimed claim 10.

12. An electric kettle including a heating element as claimed in claim 1.

* * * * *